March 10, 1931.  R. H. MOULTON  1,796,267

SHOCK ABSORBER

Filed Dec. 3, 1927

Witness:

Inventor:
Rollin H. Moulton
By Wilkinson Huxley Byron Knight
Attys

Patented Mar. 10, 1931

1,796,267

UNITED STATES PATENT OFFICE

ROLLIN H. MOULTON, OF BERWYN, ILLINOIS, ASSIGNOR TO FRY EQUIPMENT CORPORATION, OF ROCHESTER, PENNSYLVANIA, A CORPORATION OF DELAWARE

SHOCK ABSORBER

Application filed December 3, 1927. Serial No. 237,355.

My invention relates to shock absorbers or cushioning devices and has particular reference to that class of device for use on automobiles, road vehicles, airplanes, track vehicles, in fact for any parts having relative movement thereof.

In shock absorbers now in use, there are a great many of the so-called hydraulic type. Some of the finer of such type are double acting, but at the expense of added weight and finer fitted parts to prevent leakage and insure operation. This type of shock absorber is necessarily quite expensive, and in fact, the expense is such as to be almost prohibitive for cars of the cheaper type. There are other well known types of hydraulic shock absorbers which do not embody the snubbing action or embody only the snubbing action. In other words, they are not double acting, and even with such a device, the cost is not within the price range of mechanical snubbers though it is admitted that hydraulic shock absorbers are decidedly advantageous and desirable.

An object of my invention is the provision of a shock absorber which utilizes air as an absorber medium and embodies means whereby air is trapped in a container and compressed, thereby receiving the shock and cushioning the parts of the vehicle subjected to such shock.

Another object of my invention is the provision of a shock absorber in which a piston is fitted to one moving part of an automobile while a cylinder is fitted to the other moving part, with the piston head normally positioned midway of the cylinder during the usual travel of the vehicle, and adapted to travel in either direction from the center of the cylinder. As the piston starts towards either end of the cylinder, the air in the said cylinder is trapped and compressed thereby absorbing the shock, while the vacuum on the reverse side is broken and air is allowed to flow into the cylinder at the opposite side of the piston head, thereby assisting in braking the reaction of the vehicle from the shock and absorbing the shock in the opposite direction coming from the reaction of the springs of the vehicle, it being seen that substantially a vacuum is formed upon movement of the piston.

Still another object of my invention is the provision of a shock absorber which acts in a plurality of directions, thereby cushioning the shocks received when the vehicle strikes an obstruction in the road and also cushioning the reaction of the vehicle in the opposite direction after it has reached the upper limit of the movement received from the initial shock.

Yet another object is to provide a device for effectively cushioning shocks from a plurality of directions between parts.

A further object is to provide a double acting checking and cushioning device using a plurality of checks in each direction of operation, and one which combines the action of a shock absorber and a snubber.

A still further object is to provide a cushioning device readily adaptable to all uses, as on road vehicles, railroad draft gear, between parts of track vehicles having relative movement, airplanes, engine or other prime or secondary movers and their beds, in fact, between any parts having relative movement, to cushion or check said parts in operation thereof.

Yet further objects are to provide a fluid cushioning device of lighter and sturdier structure than those used, one in which little wear takes place, one that is easy to manufacture and requires little or no attention once installed, one which more adequately meets service conditions, and one which is inexpensive to make and maintain and fulfills all requirements of service and manufacture.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1:
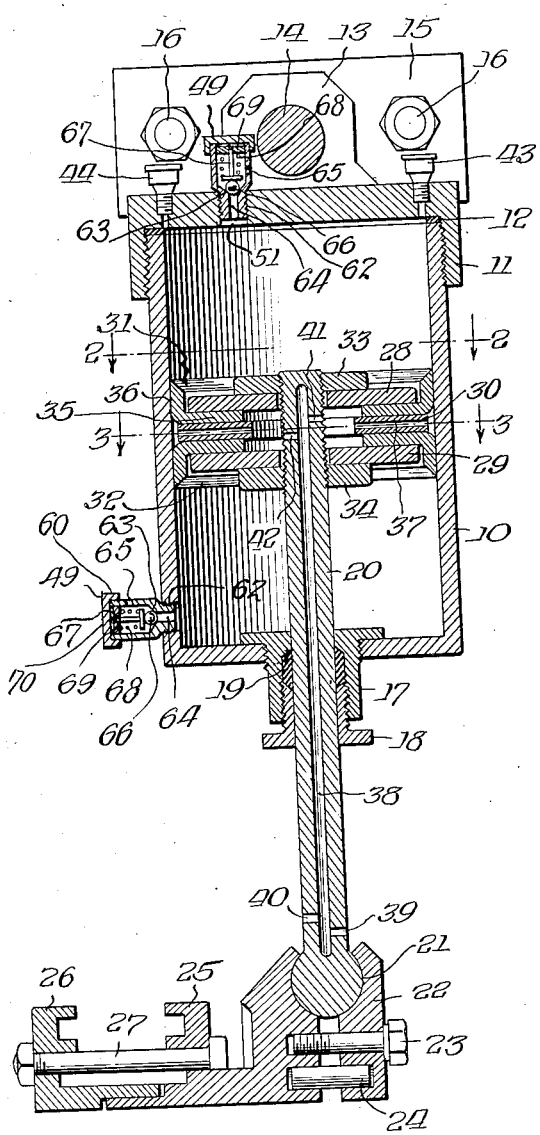
Figure 1 is a vertical sectional view of a shock absorber embodying my invention.
Figure 2:
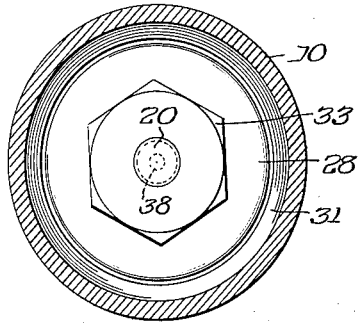
Figure 2 is a cross sectional view on line 2—2 of Figure 1.
Figure 3:
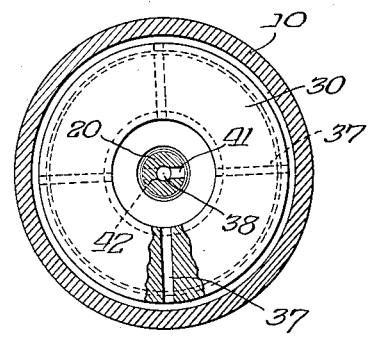
Figure 3 is a cross sectional view on line 3—3 of Figure 1.

Referring now specifically to the drawings there is shown a cylinder 10 having a head 11 at one end thereof and in threaded engagement therewith, with a ring of packing 12 interposed between the head 11 and the cylinder 10. The head 11 has a trunnion 13 formed integral therewith and extending upward therefrom, through which a pin 14 extends which is mounted upon a bracket 15, which in turn is preferably secured to one of the longitudinal side sills of an automobile frame by means of a pair of bolts 16, 16 which extend through the sill, or a suitable clamp may be provided for securing the device to the sill of a car in any approved manner.

The cylinder 10 at the opposite end from the head 11 has a gland member 17 in threaded engagement therewith and with a second gland member 18 being provided which is externally threaded and adapted to engage the internally threaded member 17 with the usual packing 19 placed in the gland member 17 so that a tight joint is provided around the piston rod 20. The said piston rod 20 has an enlarged ball head 21 formed at the lower end thereof and is adapted to be seated within a split bracket 22 having a bolt 23 extending through the split portions thereof so that the bracket 22 is held in proper engagement with the head 21 on the piston rod 20. A pin 24 is also provided to assist in holding the bracket in proper position on the head 21. The inner side of the bracket 22 has a jaw 25 with a cooperating jaw 26 through which a bolt 27 extends, these members being adapted to be secured preferably to the axle of an automobile.

Mounted in the cylinder 10 is a built up piston head shown as comprising an upper plate 28, a lower plate 29, a spacing ring 30, an upper annular flexible member 31, and a lower annular flexible member 32, these members 31 and 32 being preferably made of leather or the like and toeing toward their respective ends of the cylinder, as later described, with an upper nut 33 and a lower nut 34 each of these nuts being in threaded engagement with the piston rod 20 at its upper end, and by means of which the built up piston head, heretofore described, is clamped securely to the rod 20.

The member 31 has a horizontally extending portion 35 which is clamped between the member 28 and the ring 30, and a vertically extending portion 36 extending at right angles to the portion 35 and which is adapted to engage against the side wall of the cylinder 10, the upper edge of this portion being angularly disposed toward the center of the cylinder so the outward pressure of the air is better exerted on this member. It will be noticed that this member is cup-shaped and arranged so that the expansive force of the air is exerted against the portion 36, thereby forcing this portion of the member 31 tightly against the side of the cylinder 10 and preventing the escape of the compressed air therearound. The member 32 is also cup-shaped and is a duplicate of the member 31 except that it is turned in the opposite direction so that the expansive force of the air in the lower side of the cylinder exerts its force against the member 32 causing it to expand and tightly engage against the walls of the cylinder, as will be more fully described hereinafter.

The ring member 30 has a plurality of passages 37, 37 extending horizontally through the ring 30, through which air passes, as will be described hereinafter. The rod 20 has a longitudinally extending passage 38 therein, extending substantially the full length thereof and near the outer end has a pair of transversely extending passages 39 and 40, which communicate with the passage 38 at their inner ends and are open to the atmosphere at their outer ends. At the upper end of the rod 20 is a pair of other transversely extending passages 41 and 42 which passages communicate with longitudinal passage 38 in the piston rod 20 and terminate at the outer side of the rod 20 with an open space formed between the plates 28 and 29.

A pair of oil cups 43 and 44 are provided which are secured to the cylinder head and have ducts terminating at the inside of the cylinder by means of which inner walls of the cylinder are lubricated against which the cup members 31 and 32 engage.

At the lower end of the cylinder I provide a venting cap or valve 45 more particularly described later, which valve is threaded to the cylinder 10 and has a port therein which communicates with the cylinder 10 and the atmosphere. At the upper end of the cylinder a similar venting cap or valve 49 is provided, more particularly described later, which extends through the cylinder head 11 and which has a valve member mounted therein adapted to control the flow of air through the port 51. These devices perform the function of relief valves and reduce the pressure in each end of the cylinder, if too many rapid, successive shocks are encountered by the vehicle. In other words, these members operate as safety valves thereby reducing the internal pressure on the cylinder 10 during the operation of the device.

A form of vent cap or valve may be used, such as illustrated at 60. This valve is shown as applied to the head 11 of the cylinder as the valve 49, though it is to be understood that this valve may be used as the valve 45. The valve consists essentially of a housing 13

61 having a threaded portion 62 adapted to be threaded into the cylinder head 11, the housing 61 being provided with a seat 63 having an opening 64 therein permitting communication between the inside of the cylinder and the atmosphere through the opening 65. As shown, a ball valve 66 is normally seated on the seat 63 to close the opening 64, the ball valve being spring pressed by the plunger 67 and the spring 68 disposed between the plunger and a guide member 69 carried by and threaded into the housing 61, a retaining cap 70 being provided to prevent unauthorized disturbance of the parts of the valve, it being understood that the member 69 is provided for the adjustment of the spring by relative movement with respect to the housing 61 whereby a predetermined pressure may be built up so that the valve will not open until after this pressure is overcome by the compression of the air between the cylinder and the piston.

In operation the device is attached to an automobile by means of the bracket 15 which is preferably attached to the longitudinally extending sill of the car with the bracket 22 attached to one of the axles, with the piston head centrally positioned with respect to the cylinder 10 so that the cylinder 10 is free to move in either direction.

In the normal position of the device, which may be characterized as the "at rest" position, the members 31 and 32 are in fairly close engagement with the side of the cylinder 10, but sufficiently loose to allow air to pass therearound. In other words, the air in the cylinder 10 is at normal atmospheric pressure by reason of the open passages 39 and 40, 38, passages 41 and 42, and the horizontally extending passages 37 in the member 30. As the automobile meets with an obstruction in the road compressing the springs, thereby forcing the piston head towards the upper end of the cylinder, there will be a slight escape of the air around the sides of the member 31, but as the air which is trapped in the upper end of the cylinder is compressed, the portion 36 of the member 31 is forced outward against the side of the cylinder tightly enough to prevent the escape of air therearound, thereby forming an air tight chamber in the cylinder 10 causing the air trapped therein to be compressed and resisting the upward movement of the piston head with the increasing rate of travel of the piston head.

If this shock is too great or too sudden so that the air is compressed violently the valve 49 permits a release thereby reducing the pressure of the air to a slight degree so that the apparatus will not be damaged. In the meantime, as the piston has travelled upward, atmospheric air passes into the lower portion of the chamber through the passages in the piston rod 20 and the member 30 into the lower portion of the piston, thus breaking the substantial vacuum formed behind the piston that is in the portion of the cylinder from which the piston is travelling, which vacuum had aided the reduction of motion of the piston. As the travel of the piston head changes, this air is compressed, meeting and resisting the shock produced by the reaction of the springs of the vehicle. This reaction is assisted in a measure by the expansive force of the compressed air in the upper side of the cylinder 10, but by reason of the increased quantity of air which has entered the cylinder 10 during the upward travel of the piston, this air is compressed quickly and results in a lessening of the shock of the vehicle in a downward direction. As soon, of course, as the air in the upper part of the cylinder is reduced until its force is not sufficient to hold the upper cup member 31 in tight engagement with the wall of the cylinder, the air passes therearound and is reduced to atmospheric pressure again so that with each succeeding movement of the piston when the air pressure in either end of the cylinder is less than the normal atmospheric air pressure, the atmospheric air enters the cylinder around the edges of the packing member so that the device is kept in a state of equilibrium at the normal travel of the automobile with the piston head centrally located with respect to the cylinder 10. The action then in the reverse direction or in a series of reverse directions as in equalizing shocks in an automobile body, is similar to that which has already been described with respect to the valve 45, that is, the valve 49 and each leather functions as has been described.

It is to be understood that I do not wish to be limited by the exact embodiment of the device shown, which is merely by way of illustration and not limitation, as various and other forms of the device will of course be apparent to those skilled in the art without departure from the spirit of the invention or the scope of the claims.

I claim:

1. A shock absorber including in combination, a cylinder, a piston mounted in said cylinder, means for attaching the absorber to the moving parts of a vehicle, and relief venting means in said cylinder on each side of the piston, said piston having venting means therein, each of said venting means opening to the atmosphere.

2. A shock absorber including in combination, a cylinder, a piston in said cylinder movable toward either end of said cylinder, a plurality of venting valves opening to the atmosphere and adjusted to predetermined pressure mounted on each end of said cylinder, said piston having venting means therein for supplying air from a source external of said cylinder to the end of the cylinder from which said piston is traveling, and means whereby the shock absorber is secured to the moving parts of a vehicle.

3. A shock absorber including in combination, a cylinder, a piston head movably mounted in said cylinder, a piston rod secured to said piston head, means for securing the cylinder to a vehicle, and means for securing the piston rod to a moving part of a vehicle, the said piston rod and the piston head having direct communicating venting means therein whereby air may be directly admitted to each end of the cylinder from said piston head.

4. A shock absorber including in combination, a cylinder, a piston head movably positioned in said cylinder, a rod connected to said piston head and projecting outward through one end of said cylinder, and means for securing the said cylinder and the piston rod to moving parts of a vehicle, the said piston rod having a channel formed longitudinally therein whereby air is admitted upon movement of said piston to either end of the cylinder from which said piston is traveling.

5. A shock absorber including in combination, a cylinder, a piston in said cylinder comprising a pair of spaced plates, a spacing ring mounted between said plates, a pair of flexible cup members secured between the said spacing member and each of said plates, the said cup members having out-turned portions engaging the cylinder walls, a hollow rod connected to said piston head, the said rod having venting means and terminating adjacent said spacing member whereby atmospheric air is admitted to said cylinder.

6. A shock absorber including in combination, a cylinder, a piston movably mounted therein, and means whereby the cylinder and piston are attached to an automobile, the said piston having means whereby the escape of air is prevented from either end of the cylinder towards which the piston is traveling and whereby air is also admitted to the opposite end of the cylinder.

7. A shock absorber including in combination, a cylinder, a piston movably mounted in said cylinder and means whereby the cylinder and piston are attached to an automobile, the said piston having an air chamber in the head thereof normally in communication with the atmosphere and with the end of the cylinder from which the piston is moving, but closed to the end of the cylinder toward which the piston head is moving.

8. A shock absorber including in combination, a cylinder, a piston head mounted in said cylinder comprising a pair of spaced plates, oppositely disposed flexible members and a spacing ring having ports extending therethrough, a piston rod having venting means therein in communication with the space between the said spaced plates, and means whereby the said spaced plates, flexible members and spacing ring are clamped together and secured to said piston rod.

9. A shock absorber including in combination, a cylinder, a piston head in said cylinder comprising a pair of plates, a spacing ring having openings therein extending from the outer to the inner side thereof, a pair of flexible members between said plates and the spacing ring having their free portions oppositely disposed and in engagement with the walls of the cylinder, a piston rod having a longitudinal passage therein and vents at each end thereof, and means whereby the members comprising the piston head are held together and to the piston rod.

10. A shock absorber including in combination, a cylinder, a piston head mounted in said cylinder comprising a pair of spaced plates, oppositely disposed flexible members and a spacing ring having ports extending therethrough, a piston rod having venting means therein in communication with the space between the said spaced plates, means whereby the said spaced plates, flexible members and spacing ring are clamped together and secured to said piston rod, and venting means at each end of the said cylinder.

11. In a cushioning device, the combination of a cylinder, a piston cooperating therewith, a piston rod attached thereto, and means carried by said piston for permitting supply of fluid to a portion of said cylinder from a source external of said piston and cylinder when there is relative movement in any direction between said cylinder and piston.

12. In a cushioning device, the combination of a cylinder, a piston cooperating therewith, and a vented piston rod rigidly attached to said piston and communicating with said piston and cylinder for supplying fluid thereto in either direction of operation.

13. In a cushioning device, the combination of a cylinder, a piston cooperating therewith, a vented piston rod rigidly attached to and directly communicating with said piston, and means for premitting and preventing venting of either end of said cylinder.

14. In a cushioning device, the combination of a cylinder, a piston cooperating therewith, a vented piston rod rigidly attached to and directly communicating with said piston, and means on said piston for permitting and preventing venting of either end of said cylinder when there is relative movement between said cylinder and piston.

15. In a cushioning device, the combination of a cylinder, a piston disposed therein and normally substantially equally spaced from the ends of said cylinder, a piston rod connected to said piston, said piston including spaced members and leathers, said leathers being disposed to toe toward the adjacent cylinder end, valves communicating with and adjacent the ends of said cylinder, said valves being closed on the suction stroke of said piston, and a fluid passage provided in said piston rod providing communication between said piston and the atmosphere.

16. In a cushioning device, the combination of a cylinder, a piston disposed therein and normally substantially equally spaced from the ends of said cylinder, a piston rod connected to said piston, said piston including spaced members and leathers, said leathers being disposed to toe toward the adjacent cylinder end, valves communicating with and adjacent the ends of said cylinder, said valves being closed on the suction stroke of said piston, and a fluid passage provided in said piston rod providing communication between said piston and the atmosphere, the suction stroke of said piston in either direction causing leakage of fluid past the leathers into the part of the cylinder remote from the direction of travel of said piston.

17. In a cushioning device, the combination of a cylinder, a piston disposed therein and normally substantially equally spaced from the ends of said cylinder, a piston rod connected to said piston, said piston including spaced members and leathers, said leathers being disposed to toe toward the adjacent cylinder end, valves communicating with and adjacent the ends of said cylinder, said valves being closed on the suction stroke of said piston, and a fluid passage provided in said piston rod providing communication between said piston and the atmosphere, the suction stroke of said piston in either direction causing leakage of fluid past the leathers into the part of the cylinder remote from the direction of travel of said piston and causing opening of the valve in the part of the cylinder under compression.

18. In a cushioning device, the combination of a cylinder, a piston disposed therein and normally substantially equally spaced from the ends of said cylinder, a piston rod connected to said piston, said piston including spaced members and leathers, said leathers being disposed to toe toward the adjacent cylinder end, valves communicating with and adjacent the ends of said cylinder, said valves being closed on the suction stroke of said piston, a fluid passage provided in said piston rod providing communication between said piston and the atmosphere, the suction stroke of said piston in either direction causing leakage of fluid past the leathers into the part of the cylinder remote from the direction of travel of said piston and causing opening of the valve in the part of the cylinder under compression, and lubricating means disposed in a part of the cylinder to cause gravitational lubrication of the piston.

19. In a shock absorber, the combination of a cylinder, a piston mounted therein for relative movement with respect thereto, a piston rod secured to said piston, said piston rod being vented externally of said cylinder and to said piston whereby movement of said piston in any direction in said cylinder causes supply of fluid through said rod and piston to the portion of the cylinder from which said piston is traveling.

20. In a cushioning device, the combination of a cylinder, a piston disposed therein and normally substantially equally spaced from the ends of said cylinder, a piston rod connected to said piston, said piston including spaced members and leathers, valves communicating with and adjacent the ends of said cylinder, said valves being closed on the suction stroke of said piston with respect to said valves, said piston rod having a fluid passage provided therein providing, upon movement of said piston, communication between the atmosphere and the end of the cylinder from which the piston is moving.

21. In a shock absorber, the combination of a housing, a cushioning member movable in said housing, a member extending externally of said housing and secured to said cushioning member, said cushioning second named member and said second named member having means therein whereby either part of the housing remote from the direction of travel of said cushioning member is supplied with fluid upon movement of said cushioning member.

22. In a shock absorber, the combination of a housing, a cushioning member movable in said housing, a member extending externally of said housing and secured to said cushioning member, said cushioning second named member and said member having communicating passages therein open to the atmosphere whereby either part of the housing remote from the direction of travel of said cushioning member is supplied with air upon movement of said cushioning member.

23. In a shock absorber, the combination of a housing, a cushioning member movable in said housing, a member extending externally of said housing and secured to said cushioning member whereby said cushioning member may be moved to compress air therein, said cushioning member and said second named member having communicating passages therein open to the atmosphere whereby the part of the housing remote from the direction of travel of said cushioning member is supplied with air upon movement of said cushioning member, and means for venting said housing after a predetermined pressure has been built up.

24. In a shock absorber, the combination of a housing, a cushioning member movable in said housing, a member extending externally of said housing and secured to said cushioning member whereby said cushioning member may be moved to compress air therein, said cushioning member and said second named member having communicating passages therein open to the atmosphere whereby the part of the housing remote from the direction of travel of said cushioning member is supplied with air upon movement of said cushioning member, and pressure operated means in said housing for venting the part of said housing in which pressure is being built up by advance of said cushioning member.

25. In a shock absorbing device the combination of a cylinder, a piston head movable therein, a piston rod fixedly secured to said piston head for moving said head relatively to said cylinder, means in one end of said cylinder for permitting egress of air from said cylinder upon movement of said piston head therein, said head having means associated therewith for permitting supply of air from a source external of said cylinder to either end of said cylinder from said head.

26. In a shock absorbing device, the combination of a cylinder, a piston head movable therein, a piston rod fixedly secured to said piston head for moving said head relatively to said cylinder, means in one end of said cylinder for permitting egress of air from said cylinder upon movement of said piston head toward said end, said head having means associated therewith for permitting supply of air from a source external of said cylinder to the end of the cylinder remote from the end having said first named means.

27. In a cushioning device, the combination of a cylinder, a piston mounted thereon and having a piston rod, said piston and rod having means therein for supplying air from the atmosphere to either side of said piston upon movement thereof, and means for unequally affecting movement of said piston.

28. In a cushioning device, the combination of a cylinder, a piston mounted therein and having a piston rod, said piston and rod having means therein for supplying air from the atmosphere to either side of said piston upon movement thereof, and means associated with said cylinder for unequally affecting movement of said piston.

29. In a shock absorber wherein the shock absorbing medium is only air, the combination of a cylinder, a piston rod having a head movably mounted in said cylinder, said cylinder having closed ends whereby chambers are formed on each side of said head, one of said ends having a stuffing box through which said rod extends, said head being hollow, said rod having a channel therein opening outwardly of said rod and in communication with said hollow head, whereby air is supplied to the chamber on the side of said cylinder from which said head is traveling from the head, channel and opening.

30. In a shock absorber wherein the shock absorbing medium is only air, the combination of a cylinder, a piston rod having a head movably mounted in said cylinder, said cylinder having closed ends whereby chambers are formed on each side of said head, one of said ends having a stuffing box through which said rod extends, said head being hollow, said rod having a channel therein opening outwardly of said rod and in communication with said hollow head, means on the head operative to confine the air in the chamber on the side of the cylinder toward which the head is traveling, said means being operative to cause flow of air to the chamber on the side of said cylinder from which the head is traveling.

31. In a shock absorber wherein the shock absorbing medium is only air, the combination of a cylinder, a piston rod having a head movably mounted in said cylinder, said cylinder having closed ends whereby chambers are formed on each side of said head, one of said ends having a stuffing box through which said rod extends, said head being hollow, said rod having a channel therein opening outwardly of said rod and in communication with said hollow head, leathers of said head having portions contacting the cylinder wall and facing toward the adjacent end of said cylinder to confine the air in the chamber on the side of the cylinder toward which the head is traveling, said leathers causing flow of air to the chamber on the side of said cylinder from which the head is traveling.

32. In a shock absorber wherein the shock absorbing medium is only air, the combination of a cylinder, piston means movably mounted in said cylinder, said cylinder having closed ends whereby chambers are formed on each side of said piston means, one of said ends having a stuffing box through which a portion of said piston means extends, said piston means having means whereby air is supplied from the atmosphere to the chamber on the side of said piston means from which said piston means is traveling.

Signed at Rochester, Pa., Nov. 25th, 1927.

ROLLIN H. MOULTON.

CERTIFICATE OF CORRECTION.

Patent No. 1,796,267.  Granted March 10, 1931, to

ROLLIN H. MOULTON.

It is hereby certified that error appears in the printed specification of the above numbered patent requiring correction as follows: Page 4, line 113, for the misspelled word "premitting" read permitting; page 5, lines 91 and 92, claim 21, strike out the words "second named"; same page, line 102, claim 22, strike out the words "second named" and insert same to follow the word "said" in line 103, of same claim; and that the said Letters Patent should be read with these corrections therein that the same may conform to the record of the case in the Patent Office.

Signed and sealed this 12th day of May, A. D. 1931.

(Seal)

M. J. Moore,
Acting Commissioner of Patents.